United States Patent
Anderson et al.

(10) Patent No.: US 10,185,046 B2
(45) Date of Patent: Jan. 22, 2019

(54) METHOD FOR TEMPORAL DISPERSION CORRECTION FOR SEISMIC SIMULATION, RTM AND FWI

(71) Applicants: John E. Anderson, Houston, TX (US); Anatoly Baumstein, Houston, TX (US); Carey Marcinkovich, The Woodlands, TX (US); Tetyana Vdovina, Houston, TX (US); Valeriy Brytik, Houston, TX (US)

(72) Inventors: John E. Anderson, Houston, TX (US); Anatoly Baumstein, Houston, TX (US); Carey Marcinkovich, The Woodlands, TX (US); Tetyana Vdovina, Houston, TX (US); Valeriy Brytik, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 555 days.

(21) Appl. No.: 14/670,085

(22) Filed: Mar. 26, 2015

(65) Prior Publication Data

US 2015/0355356 A1    Dec. 10, 2015

Related U.S. Application Data

(60) Provisional application No. 62/009,593, filed on Jun. 9, 2014.

(51) Int. Cl.
  *G01V 1/32* (2006.01)
  *G01V 1/36* (2006.01)
  *G01V 1/28* (2006.01)

(52) U.S. Cl.
  CPC .............. *G01V 1/36* (2013.01); *G01V 1/28* (2013.01); *G01V 2210/44* (2013.01); *G01V 2210/51* (2013.01); *G01V 2210/679* (2013.01)

(58) Field of Classification Search
  CPC .................................. G01V 1/36; G01V 1/28
  See application file for complete search history.

(56) References Cited

U.S. PATENT DOCUMENTS

| | | | |
|---|---|---|---|
| 3,812,457 | A | 5/1974 | Weller |
| 3,864,667 | A | 2/1975 | Bahjat |

(Continued)

FOREIGN PATENT DOCUMENTS

| | | |
|---|---|---|
| CA | 2 796 631 | 11/2011 |
| EP | 1 094 338 | 4/2001 |

(Continued)

OTHER PUBLICATIONS

Anderson et al., "Numerical Temporal Dispersion Corrections for Broadband Temporal Simulation, RTM and FWI", SEG New Orleans Annual Meeting, Oct. 2015, pp. 1096-1100.*

(Continued)

*Primary Examiner* — Benjamin Sandvik
(74) *Attorney, Agent, or Firm* — ExxonMobil Upstream Research Company Law Department

(57) ABSTRACT

Method for correcting seismic simulations, RTM, and FWI for temporal dispersion due to temporal finite difference methods in which time derivatives are approximated to a specified order of approximation. Computer-simulated seismic data (51) are transformed from time domain to frequency domain (52), and then resampled using a mapping relationship that maps, in the frequency domain, to a frequency at which the time derivative exhibits no temporal dispersion (53), or to a frequency at which the time derivative exhibits a specified different order of temporal dispersion. Alternatively, measured seismic data from a field survey (61) may have temporal dispersion of a given order introduced, by a similar technique, to match the order of (Continued)

approximation used to generate simulated data which are to be compared to the measured data.

16 Claims, 8 Drawing Sheets

(56) References Cited

U.S. PATENT DOCUMENTS

| | | | |
|---|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,649,805 B2 * | 1/2010 | Bose ............... G01V 1/48 |
| | | | 367/38 |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 7,941,273 B2 * | 5/2011 | Thomsen ............... G01V 3/083 |
| | | | 367/38 |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,451,684 B2 * | 5/2013 | Lee ............... G01V 1/28 |
| | | | 367/38 |
| 8,456,952 B2 * | 6/2013 | Tang ............... G01V 1/30 |
| | | | 367/49 |
| 8,547,794 B2 | 10/2013 | Gulati et al. |
| 8,688,381 B2 | 4/2014 | Routh et al. |
| 8,781,748 B2 | 7/2014 | Laddoch et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |

(56) References Cited

U.S. PATENT DOCUMENTS

| | | |
|---|---|---|
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0243371 A1 | 9/2012 | Zhang |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Li et al., "3D weak-dispersion reverse time migration using a stereo-modeling operator", Geophysics, vol. 80, No. 1, Feb. 2015, pp. 519-530.*

Liang et al., "Comparison of numerical dispersion for finite-difference algorithms in transversely isotropic media with a vertical symmetry axis", J. Geophysics Eng., vol. 12, Dec. 2015, pp. 108-113.*

Anderson et al., "Time-reversal checkpointing methods of RTM and FWI", Geophysics, vol. 77, No. 4, Aug. 2012, pp. 93-103.*

Bunks et al., "Multiscale seismic waveform inversion", Geophysics, vol. 60, No. 5, Oct. 1995, pp. 1457-1473.*

Baysal et al., "Reverse Time Migration", Geophysics, vol. 48, No. 11, Nov. 1983, pp. 1514-1524.*

Jones, "Tutorial: migration imaging conditions", www.firstbreak.org, vol. 32, Dec. 2014, pp. 45-55.*

Fontana et al., "Past, Present and Future Advancements in Methods for Detecting Hydrocarbon Seepage after 75 Years*", Jul. 2014, AAPG Rocky Mountain Section Meeting, Denver, CO, Jul. 2014, 49 pages.*

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.

Barr, F.J. et al. (1989), "Attenuation of Water-Column Reverberations Using Pressure and Velocity Detectors in a Water-Bottom Cable," 59th Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

(56) References Cited

OTHER PUBLICATIONS

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transform," *J. Math. Phys.* 26, pp. 99-108.

Biondi, B. (1992), "Velocity estimation by beam stack," *Geophysics* 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Wavefrom using Dynamic Random Phase Encoding, SEG Denver 2010 Annual Meeting, pp. 1044-1049.

Boonyasiriwat, C. et al. (2010), 3D Multisource Full-Wavefrom using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full wavefoiin inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," 73$^{rd}$ EAGE Conference, *Abstract*, pp. F026.

Choi, Y et al. (2012), "Application of multi-source waveform inversion to marine stream data using the global correlation naim," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J.W. et al. (1973), "Effect of Noimal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gao, H. et al. (2008), "Implementation of perfectly matched layers in an arbitrary geometrical boundary for leastic wave modeling," *Geophysics J. Int.* 174, pp. 1029-1036.

Gibson, B. et al. (1984), "Predictive deconvolution and the zero-phase source," *Geophysics* 49(4), pp. 379-397.

Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, a. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Hampson, D.P. et al. (2005), "Simultaneous inversion of pre-stack seismic data," SEG 75$^{th}$ Annual Int'l. Meeting, *Expanded Abstracts*, pp. 1633-1637.

Heinkenschloss, M. (2008), :"Numerical Solution of Implicity Constrained Optimization Problems," CAAM Technical Report TR08-05, 25 pgs.

Helbig, K. (1994), "Foundations of Anisotropy for Exploration Seismics," Chapter 5, pp. 185-194.

Hellmann, F.J. (2010), "Randomized dimensionality reduction for full-wavefami inversion," *EAGE abstract* G001, EAGE Barcelona meeting, 5 pgs.

Holschneider, J. et al. (2005), "Characterization of dispersive surface waves using continuous wavelet transfolins," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J. Int.* 124, pp. 363-371.

(56) References Cited

OTHER PUBLICATIONS

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70th Annual Meeting Expanded Abstracts*, pp. 786-789.

Kennett, B.L.N. (1991), "The removal of free surface interactions from three-component seismograms", *Geophys. J. Int.* 104, pp. 153-163.

Kennett, B.L.N. et al. (1988), "Subspace methods for large inverse problems with multiple parameter classes," *Geophysical J.* 94, pp. 237-247.

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," *70th SEG Ann. Meeting, Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," *The Leading Edge*, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whitey & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007), "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge*, pp. 156-166.

Meier, M.A. et al. (2009), "Converted wave resolution," *Geophysics*, 74(2):doi:10.1190/1.3074303, pp. Q1-Q16.

Moghaddam, P.P. et al. (2010), "Randomized full-wavefield inversion: a dimenstionality-reduction approach," 80th SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, $2^{nd}$ Edition, pp. 165-176.

Nocedal, J. et al. (2000), "Numerical Optimization-Calculating Derivatives," Chapter 8, Springer Verlag, pp. 194-199.

Ostmo, S. et al. (2002), "Finite-difference iterative migration by linearized waveform inversion in the frequency domain," SEG Int'l. Expo. & $72^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ronen S. et al. (2005), "Imaging Downgoing waves from Ocean Bottom Stations," *SEG Expanded Abstracts*, pp. 963-967.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.

Schoenberg, M. et al. (1989), "A calculus for finely layered anisotropic media," *Geophysics* 54, pp. 581-589.

Schuster, G.T. et al. (2010), "Theory of Multisource Crosstalk Reduction by Phase-Encoded Statics," SEG Denver 2010 Ann. Meeting, pp. 3110-3114.

Sears, T.J. et al. (2008), "Elastic full waveform inversion of multi-component OBC seismic data," *Geophysical Prospecting* 56, pp. 843-862.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

(56) References Cited

OTHER PUBLICATIONS

Sheng, J. et al. (2006), "Early arrival waveform tomography on near-surface refraction data," *Geophysics* 71, pp. U47-U57.
Sheriff, R.E.et al. (1982), "*Exploration Seismology*", pp. 134-135.
Shih, R-C. et al. (1996), "Iterative pre-stack depth migration with velocity analysis," *Terrestrial, Atmospheric & Oceanic Sciences* 7(2), pp. 149-158.
Shin, C. et al. (2001), "Waveform inversion using a logarithmic wavefield," *Geophysics* 49, pp. 592-606.
Simard, P.Y. et al. (1990), "Vector Field Restoration by the Method of Convex Projections," *Computer Vision, Graphics and Image Processing* 52, pp. 360-385.
Sirgue, L. (2004), "Efficient waveform inversion and imaging: A strategy for selecting temporal frequencies," *Geophysics* 69, pp. 231-248.
Soubaras, R. et al. (2007), "Velocity model building by semblance maximization of modulated-shot gathers," *Geophysics* 72(5), pp. U67-U73.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. P.SM213-SM221.
Symes, W.W. (2009), "Interface error analysis for numerical wave propagation," *Compu. Geosci.* 13, pp. 363-371.
Tang, Y. (2008), "Wave-equation Hessian by phase encoding," *SEG Expanded Abstracts* 27, pp. 2201-2205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Tarantola, A. (1984), "Inversion of seismic reflection data in the acoustic approximation," *Geophysics* 49, pp. 1259-1266.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," Elsevier Science, p. 8.
Valenciano, A.A. (2008), "Imaging by Wave-Equation Inversion," A Dissertation, Stanford University, 138 pgs.
van Groenestijn, G.J.A. et al. (2009), "Estimating primaries by sparse inversion and application to near-offset reconstruction," *Geophyhsics* 74(3), pp. A23-A28.
van Manen, D.J. (2005), "Making wave by time reversal," SEG International Exposition and 75th Annual Meeting, *Expanded Abstracts*, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Versteeg, R. (1994), "The Marmousi experience: Velocity model determination on a synthetic complex data set," *The Leading Edge*, pp. 927-936.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," Geophysics 72(2), pp. V33-V39.
Wang, K. et al. (2009), "Simultaneous full-wavefoim inversion for source wavelet and earth model," SEG Int'l. Expo. & Ann. Meeting, Expanded Abstracts, pp. 2537-2541.
Weglein, A.B. (2003), "Inverse scattering series and seismic exploration," *Inverse Problems* 19, pp. R27-R83.
Wong, M. et al. (2010), "Joint least-squares inversion of up- and down-going signal for ocean bottom data sets," *SEG Expanded Abstracts* 29, pp. 2752-2756.
Wu R-S. et al. (2006), "Directional illumination analysis using beamlet decomposition and propagation," *Geophysics* 71(4), pp. S147-S159.
Xia, J. et al. (2004), "Utilization of high-frequency Rayleigh waves in near-surface geophysics," *The Leading Edge*, pp. 753-759.
Xie, X. et al. (2002), "Extracting angle domain infoimation from migrated wavefield," *SEG Expanded Abstracts*21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," SIAM, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
U.S. Appl. No. 14/329,431, filed Jul. 11, 2014, Krohn et al.
U.S. Appl. No. 14/330,767, filed Jul. 14, 2014, Tang et al.
Aldridge, D.F. et al. (2008), "Numerical dispersion for the conventional-staggered-grid finite-difference elastic wave propagation algorithm," Sandia National Laboratories, SAND2008-4991, pp. 1-45.
Aldridge, D.F. et al. (2008), "Numerical dispersion for the conventional-staggered-grid finite-difference elastic wave propagation algorithm," Sandia National Laboratories, SAND2008-4991, pp. 46-91.
Claerbout, J. (1985), "*Imaging the Earth's Interior*," Blackwell Scientific Publications, pp. 96-99, 104, 116, 126, 141, 256-257, 265, 284, 305-307.
Crank, J. et al. (1947), "A practical method for numerical evaluation of solutions of partial differential equations of the heat conduction type". *Proc. Camb. Phil. Soc.* 43(1), pp. 50-67.
Etgen, J.T. et al. (2009), "The pseudo-analytical method: application of pseudo-Laplacians to acoustic and acoustic anisotropic wave propagation," SEG Houston 2009 Int'l Exposition and Annual Meeting, pp. 2552-2556.
Fei, T. (1993), "Elimination of numerical dispersion in finite difference modeling and migration by flux-corrected transport," Ph.D. thesis, Colorado School of Mines, 39 pgs.
Morse, P.M. et al. (1953) "*Methods of Theoretical Physics, Part I*," New York, McGraw-Hill, pp. 125-126, 271, and 509-510.
Stork, C. (2013), "Eliminating nearly all dispersion error from FD modeling and RTM with minimal cost increase," *EAGE Expanded Abstracts*, 5 pgs.

* cited by examiner a) RTM with time dispersion error mis-positions the reflector and changes the reflector wavelet b) RTM with inverse time dispersion filtering fixes the artifacts

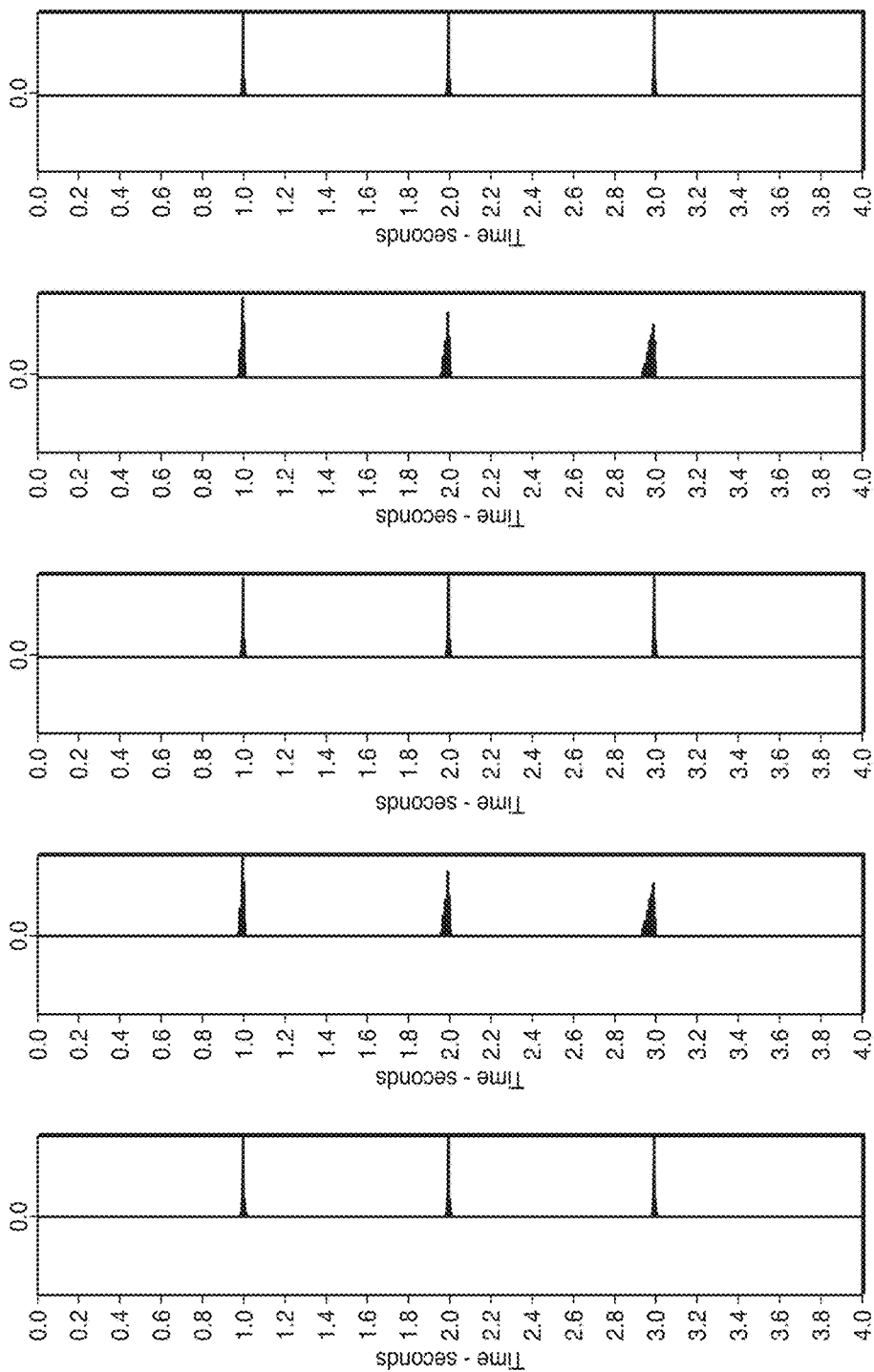

METHOD FOR TEMPORAL DISPERSION CORRECTION FOR SEISMIC SIMULATION, RTM AND FWI

CROSS-REFERENCE TO RELATED APPLICATION

This application claims the benefit of U.S. Provisional Patent Application 62/009,593, filed Jun. 9, 2014, entitled A Method for Temporal Dispersion Correction for Seismic Simulation, RTM and FWI, the entirety of which is incorporated by reference herein.

FIELD OF THE INVENTION

The invention relates generally to the field of geophysical prospecting for hydrocarbons and, more particularly, to seismic data processing. Specifically, the invention relates to the technical fields of seismic simulation, reverse time depth migration, and full waveform inversion of seismic data to infer a subsurface model of velocity or other physical property. In addition, many other useful industrial simulators for doing electromagnetic propagation, reservoir simulation and heat flow may match the form needed for this invention to apply. As will be explained later in the invention disclosure, the necessary form corresponds to that of a stationary differential operator equation including mixed or non-mixed terms of spatial and temporal derivatives with coefficients that may vary with space but do not vary in time.

BACKGROUND OF THE INVENTION

A seismic simulator used to compute either a forward simulation of a source or the adjoint simulation of a recorded wave field is typically implemented using a time stepping algorithm based upon a selected finite difference approximation to either a first or a second time derivative. Most historical implementations have been for 2nd order time stepping (error is proportional to $(\Delta t)^2$, where $\Delta t$ is the time step) because that is easy and efficient to implement and requires fewer resources. Using 2nd order time stepping provides a result with temporal dispersion artifacts. Higher-order approximations are better, because the error for approximation of order n is proportional to $(\Delta t)^n$ which→0 as n→∞ for $\Delta t<1$. But any finite-order approximation suffers from some degree of temporal dispersion. If the temporal dispersion is not corrected, the application of this type of simulator for forward simulation or to compute Reverse Time Depth Migration (RTM) images and Full Waveform Inversion (FWI) gradients and Hessians will have errors that degrade the value of these products for petroleum exploration and geophysical prospecting.

SUMMARY OF THE INVENTION

In one embodiment, the invention is a method for prospecting for hydrocarbons. Measured seismic data are obtained. Corresponding simulated seismic data are computer-generated using a finite-difference, time-stepping algorithm that approximates a time derivative operator to a selected order of approximation. The simulated seismic data are used to perform full-waveform inversion or reverse-time migration of the measured seismic data, wherein temporal numerical dispersion corresponding to the selected order of approximation is (i) removed from the simulated seismic data or (ii) introduced into the measured seismic data by steps including performing a Fourier transform in time on (i) the simulated or (ii) the measured seismic data, then resampling the transformed seismic data in frequency domain, and then performing an inverse Fourier transform from frequency domain back to time domain. The resampling utilizes a property of a class of stationary finite-difference operators whereby, in frequency domain, an aspect of the temporal numerical dispersion is that a desired numerical solution for a given frequency is computed at an incorrect frequency, and the resampling uses a mapping relationship that maps the incorrect frequency to the given frequency. The full-waveform-inverted seismic data or the reverse-time-migrated seismic data may then be used in known methods to prospect for hydrocarbons. The resampled frequency-domain seismic data may be scaled with a frequency-dependent scaling factor before performing the inverse Fourier transform back to time domain.

BRIEF DESCRIPTION OF THE DRAWINGS

The present invention and its advantages will be better understood by referring to the following detailed description and the attached drawings, in which:

FIGS. 11A-11E show results of a test example showing the temporal dispersion effects on the seismic wavelet due to finite difference simulation, then applying the present inventive method to remove or add temporal dispersion effects;

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
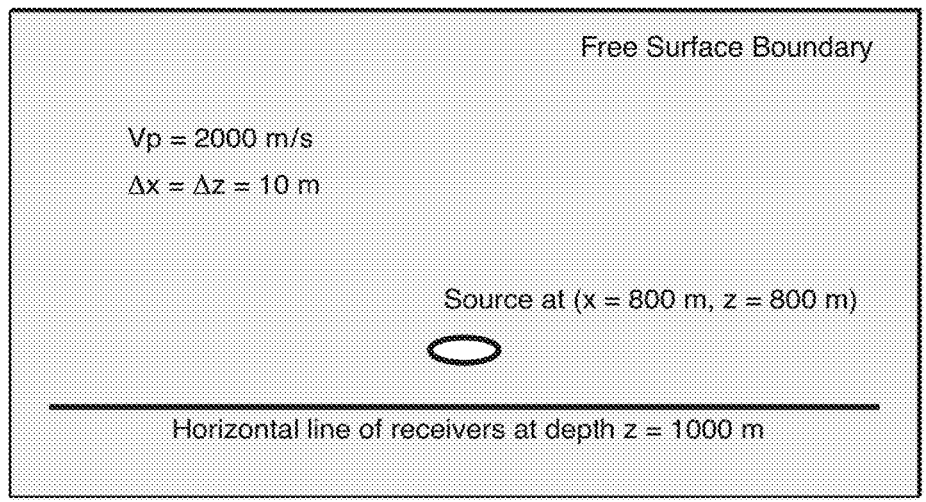
FIG. 1 shows a simple two-dimensional earth model for a homogeneous half space with a free surface boundary on top.
Figure 2:
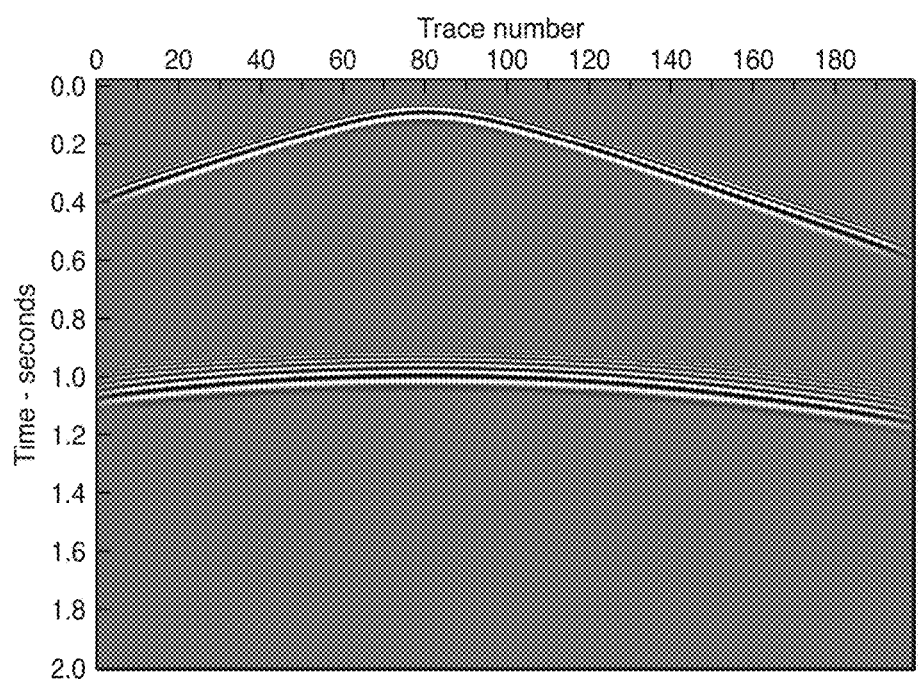
FIG. 2 shows simulated seismic data generated using the earth model of FIG. 1 and using a finite difference algorithm that is $2^{nd}$ order in time and $14^{th}$ order in space.

To illustrate the problem that the present invention solves, consider an earth model consisting of a simple two-dimensional half-space with a free surface boundary on top as shown in FIG. 1. The p-wave velocity is 2000 m/s. The source is located at x=800 m and z=800 m. The receivers are located on a line at a depth of 1000 m. The only reflector in the model is the free surface boundary. An impulsive source is simulated at zero time and the simulated receiver data due to a finite difference algorithm is shown in FIG. 2. The acoustic finite difference algorithm applied to the model is second order in time and $14^{th}$ order in space. The vertical axis is time in seconds. The horizontal axis is trace number and there is a 10 m increment between trace locations. A large time step is used in the simulation and the events are distorted by temporal numerical dispersion. High-frequency energy arrives early. Very low-frequency energy arrives at roughly the correct time. The different wave propagation speeds for different frequencies is called dispersion. The exact acoustic wave equation in this case should provide a solution where all frequency components propagate at the same speed. The numerical solution has dispersion because the temporal finite difference operator is inexact. The temporal numerical dispersion is a larger effect for higher frequencies and later times.

Figure 3:
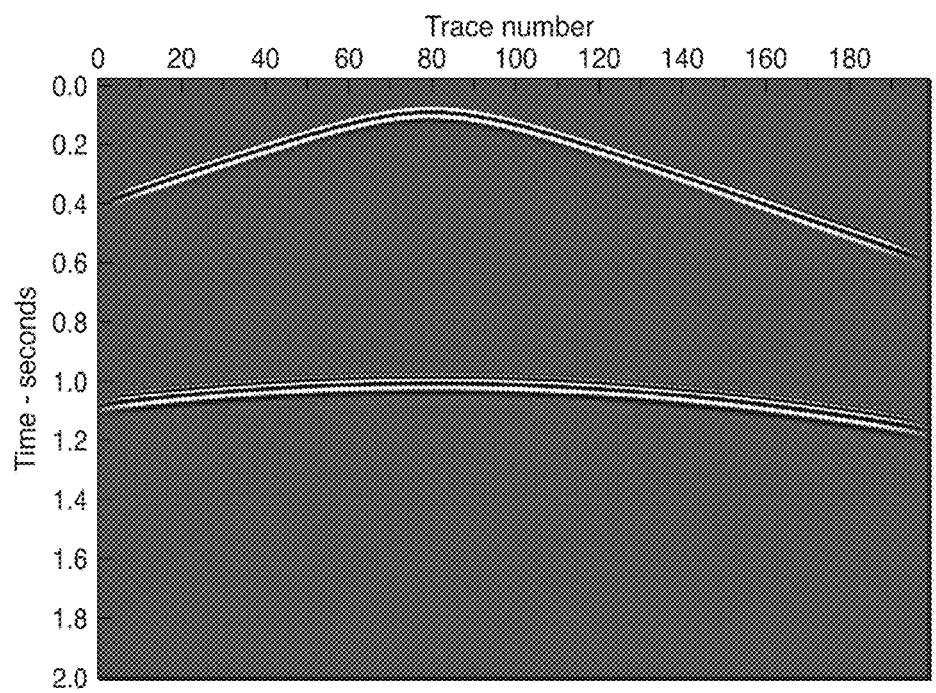
FIG. 3 shows simulated seismic data for the same earth model in FIG. 1 but with a much smaller time step for the finite difference in time than the simulation in FIG. 2.
Figure 4:
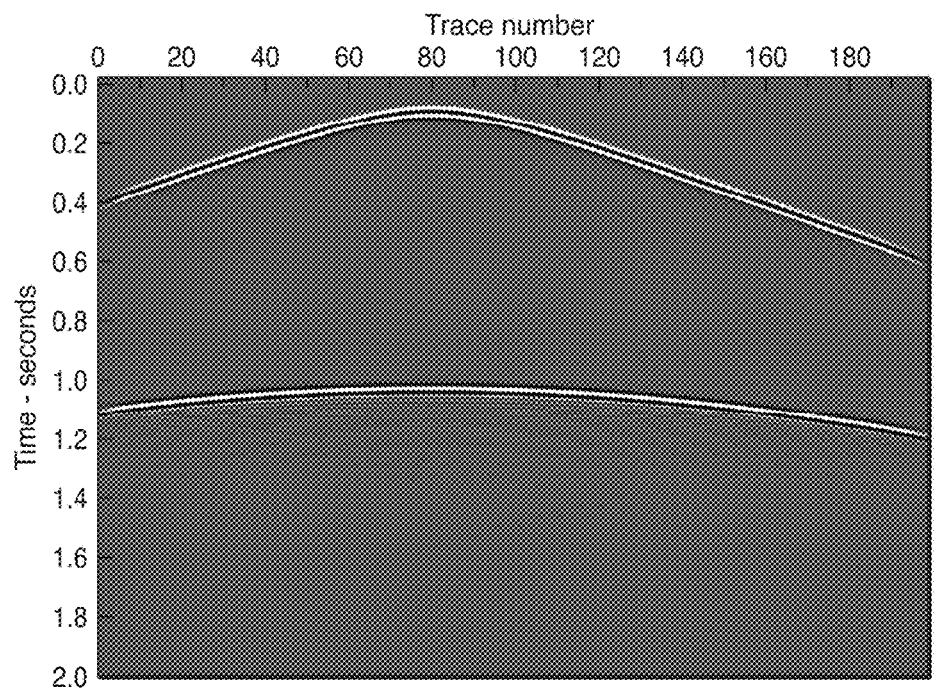
FIG. 4 shows the simulated data from FIG. 2 after applying the present inventive method to correct for temporal numerical dispersion.

FIG. 3 shows simulated seismic data for the same earth model in FIG. 1, but with a much smaller time step for the finite difference in time than the simulation in FIG. 2. These simulated data have less temporal numerical dispersion than shown in FIG. 2 but cost 1.5 times as much to simulate. This is the conventional way of minimizing temporal dispersion. FIG. 4 shows the simulated data from FIG. 2 after applying the present invention to correct for temporal numerical dispersion. The seismic events in FIG. 4 show much more accurate simulations compared to FIG. 2, and compare favorably to the results in FIG. 3. The cost associated with making this correction is very small compared to the cost of the simulation so the cost is almost the same as that for the data in FIG. 2. The invention enables accurate seismic simulation with a large time-step increment and lower cost to match or improve upon the accuracy of a costly seismic simulation with a very small time-step increment.

As stated above, a finite difference operator used for computing a temporal derivative has approximations that create numerical errors when used to solve partial differential equations. It is a realization of the present invention that for certain types of stationary differential operators that incorporate approximate temporal derivative operators, the correct solution is computed by the approximate equation, but at the wrong frequency. The invention uses this feature to correct an approximate solution into a more correct solution by a resampling operation in the frequency domain.

Virtually all of the time-domain forward and adjoint wave simulation algorithms used for seismic simulation, seismic migration and seismic full waveform inversion correspond to the type of stationary differential operators to which this invention applies. Electromagnetic equations and heat flow problems can also be formulated in a way such that the theory developed here applies. Thus, a wide range of time simulation processes may be able to use this method.

The form necessary for the invention to apply corresponds to that of a stationary differential operator equation including mixed or non-mixed terms of spatial and temporal derivatives with coefficients that may vary with space but do not vary in time. The differential operators for time stepping can be either explicit or implicit. For seismic simulation, RTM, and FWI applications, the basic import of this is that the earth model properties do not change during one seismic simulation. Alternatively, this assumption would be violated if the earth model were to change during the simulation. One example of a violation of this assumption would be if moving water waves on the air-water boundary were to make the earth model properties change with time during the simulation.

The present invention differs from Stork (2013) in many ways: (a) how the temporal numerical dispersion is corrected or applied (The invention uses Fourier-domain resampling instead of Stork's choice of time-domain filter banks to implement temporal numerical dispersion corrections.); (b) by extending the application to FWI objective function, gradient and Hessian computations; (c) by modifying dispersion from approximate derivative operators of any order of accuracy to any other order of accuracy and thereby enabling the match of temporal operator order to spatial operator, which enables (d) the application of temporal dispersion correction operators or their inverse to less perfect spatial operators. Shorter spatial operators enable more efficient halo exchanges for parallel domain-decomposed computations. The combination of all of these aspects can lead to improved efficiencies for a given level of accuracy for simulators, RTM applications and FWI applications.

The present invention differs from the patent application by Zhang et al. (2012) because the key step in the process is resampling in the frequency domain rather than filtering in the frequency domain. Filtering typically implies convolution but this invention is instead based upon resampling to change variables. The invention also has a more general range of applicability to a specific class of stationary differential operator equations. As a result the present invention applies to time-stepping differential equations in other fields, e.g. heat flow and reservoir simulation, in addition to seismic simulation and seismic migration. Zhang does not teach us to apply his method to FWI or other seismic applications.

Computing $\omega_{approx}(\omega)$ for an Example Finite Difference Operator

A finite difference solution applies approximate derivative operators to solve a problem. The approximate derivative operators in the time domain can be Fourier transformed to the frequency domain and compared to the exact form of the derivative, which is $i\omega$.

The Fourier transform $F(\omega)$ of an explicit finite difference operator with coefficients $f_j$ at times $t_j$ is the Fourier transform of a digital filter. It is computed by the following equation.

$$F(\omega) = \sum_{j=0}^{N-1} f_j(t_j) e^{-i\omega t_j} \tag{1.1}$$

On a regular grid, a second derivative finite difference operator is a symmetric digital filter.

Consider for example the explicit convolutional centered second derivative in time finite difference operator with $n_{order}+1$ coefficents. Here, the coefficients $a_j$ represent the zero lag and positive lags of a symmetric filter used to approximate the second derivative operator. Those coefficients can be Taylor series coefficients or be optimized coefficients designed to fit a specified bandwidth with high accuracy. The exact operator in the Fourier domain would be $-\omega^2$. On a regular grid, a second derivative finite difference operator is a symmetric digital filter. The Fourier transform of a symmetric digital filter is a cosine transform $$-\omega_{approx}^2(n_{order}, \omega, \Delta t) = \frac{a_0 + 2\sum_{j=1}^{n_{order}/2} a_j \cos(\omega j \Delta t)}{\Delta t^2} \tag{1.2}$$

where $n_{order}$ is the order of the finite difference approximation and $\Delta t$ is the finite time step. Comparing the exact operator in the Fourier domain to the approximate finite difference operator in the Fourier domain leads to the following relationship between approximate angular frequency and true angular frequency.

$$\omega_{approx}(n_{order}, \omega, \Delta t) = \frac{\sqrt{-a_0 - 2\sum_{j=1}^{n_{order}/2} a_j \cos(j\omega\Delta t)}}{\Delta t} \tag{1.3}$$

The error for this order of approximation will be proportional to $(\Delta t)^{n_{order}}$ when equation (1.3) applies to explicit temporal derivative operators derived from Taylor series expansions.

The second order approximation for the angular frequency made while doing a finite difference temporal second derivative corresponds to the following in the frequency domain as a function of the true angular frequency $\omega$ and the time step increment $\Delta t$.

$$\omega_{approx}(2, \omega, \Delta t) = \frac{\sqrt{2 - 2\cos(\omega\Delta t)}}{\Delta t} = \frac{2}{\Delta t}\sin\left(\frac{\psi\Delta t}{2}\right) \tag{1.4}$$

The inverse mapping from approximate angular frequency to true angular frequency can also be made.

$$\omega(\omega_{approx}, \Delta t) = \frac{1}{\Delta t}\cos^{-1}\left(1 - \frac{(\omega_{approx}\Delta t)^2}{2}\right) = \frac{2}{\Delta t}\sin^{-1}\left(\frac{\omega_{approx}\Delta t}{2}\right) \tag{1.5}$$

The examples above have been for explicit convolutional-style temporal derivative operators. This type of mapping can also be done for implicit operators as described by Crank and Nicolson (1947) that could be designed to have properties of unconditional stability for time stepping with large time increments. The most common Crank-Nicolson approach as implemented by Claerbout (1985) for a wave equation would use the second-order bilinear Z transform. For that case, this mapping would apply:

$$\omega_{approx}(\omega, \Delta t) = \frac{2}{\Delta t}\tan\left(\frac{\omega\Delta t}{2}\right). \tag{1.6}$$

Comparing Solutions for Stationary Differential Operator Equations

Consider a differential operator L operating on a function u equal to a broad band source term $s(x,t)$. Choose L to be a linear sum of terms, each scaled by the spatially varying coefficients and/or by spatial derivatives to any order and/or by mixed spatial derivatives to any order and/or by time derivatives to any order. The operator varies spatially with the $k^{th}$ operator coefficient term $c_k$ optionally a function of position x. However the operator is stationary with respect to time in that operator coefficients $c_k$ are not time dependent. The operator L may be dependent upon temporal derivatives of any order but not on time explicitly.

$$L\left(c_k(x), \frac{\partial}{\partial x_i}, \frac{\partial}{\partial t}\right)u(x, t) = s(x, t) \tag{1.7}$$

If the operator L contains time derivatives of any order but no coefficients that vary with time, then the frequency-domain equivalent operator $\tilde{L}$ retains a similar form with each time derivative replaced by $i\omega$. Such an operator L is of the type of stationary differential operator to which the present inventive method applies.

Then if $U(x,\omega)$ is the temporal Fourier transform of the solution wavefield $u(x,t)$ and $S(x,\omega)$ is the temporal Fourier transform of the source term $s(x,t)$, $$\tilde{L}\left(c_k(x), \frac{\partial}{\partial x_i}, \omega\right)U(x, \omega) = S(x, \omega). \tag{1.8}$$

The Helmholtz equation (Morse and Feschbach, 1953) is an example of a differential equation with the form given in equation 1.8.

The following two operator equations have identical solutions for $\omega_2 = \omega_1$. Mathematically, this is a trivial statement since the two equations are identical except that the variables have been renamed. The key point is that $\omega_1$ and $\omega_2$ can represent different temporal derivative operators. This is how one can recognize that the approximate solution contains within it the true solution at the wrong frequency.

$$\tilde{L}\left(c_k(x), \frac{\partial}{\partial x_i}, \omega_1\right)U(x, \omega_1) = S(x, \omega_1) \tag{1.9}$$

$$\tilde{L}\left(c_k(x), \frac{\partial}{\partial x_i}, \omega_2\right)U(x, \omega_2) = S(x, \omega_2) \tag{1.10}$$

In practice, the solution $U_1(x,\omega_1)$ to the operator $\omega_2(\omega_1)$ is usually computed for the following equation.

$$\tilde{L}\left(c_k(x), \frac{\partial}{\partial x_i}, \omega_2(\omega_1)\right) U_1(x, \omega_1) = S(x, \omega_1) \quad (1.11)$$

If $\omega_1 = \omega_{exact}$ and $\omega_2(\omega_1)$ is the Fourier transform of a temporal finite difference operator, then $U_1(x,\omega_1)$ would represent the solution to a specific temporal finite difference approximation. That solution can be mapped by a resampling and scaling operator in the frequency domain into a solution $U_2(x,\omega_2)$ with exact temporal derivatives consistent with equation (1.12) as follows.

$$U_2(x, \omega_2) = U_1(x, \omega_2(\omega_1)) \frac{S(x, \omega_2(\omega_1))}{S(x, \omega_1)} \quad (1.12)$$

Figure 5:
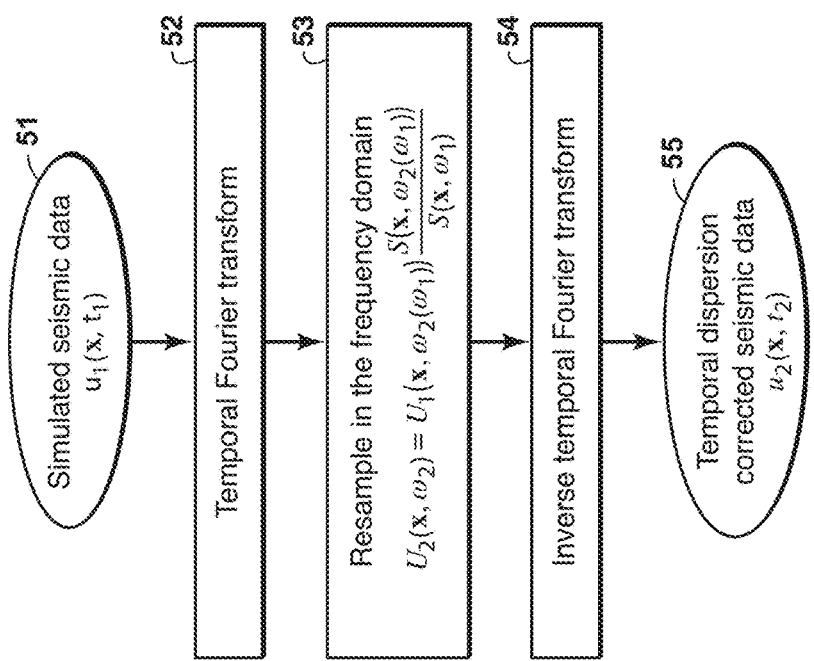
FIG. 5 is a flow chart giving basic steps in an embodiment of the present invention that removes temporal numerical dispersion from simulated seismic data by resampling and scaling the transform of the simulated data in the frequency domain.

Basic steps in this embodiment of the present inventive method are shown in the flow chart in FIG. 5. Note that $U_1(x,\omega_1)$ and $U_2(x,\omega_2)$ could be solutions to different operator equations if the meaning of $\omega_1$ and $\omega_2$ are different in the context of approximate and exact temporal derivative operators. Then the same mapping given in equation (1.12) still applies but in a different context. Basic steps in a second embodiment of the present inventive method suitable to be used for RTM and FWI applications are given in the flow chart in FIG. 6.

Equation 1.12 is quite general. However, one limitation is that if multiple seismic sources are being simultaneously simulated in a single simulation, as in simultaneous-source FWI or simultaneous source RTM (see, for example, U.S. Pat. No. 8,121,823 to Krebs, et al.), then the simultaneous sources need to have the same source time functions to within a scale factor. They can vary by scale factors of +1 and −1. They may be in multiple spatial locations.

In summary, the invention applies to correcting or modifying temporal numerical dispersion characteristics associated with solutions to stationary differential operator equations of the style discussed above. In one of its FIG. 5 embodiments, the present inventive method comprises the following basic steps:

(1) Begin with a solution $u_1(x,t_1)$ to a stationary differential operator equation $Lu_1(x,t_1) = s(x,t_1)$ using a known approximate or true temporal derivative operator. This solution is the simulated seismic data 51 in the flow chart of FIG. 5.

(2) In step 52, do a temporal Fourier transform from time $t_1$ to angular frequency $\omega_1$ converting $u_1(x,t_1)$ into $U_1(x,\omega_1)$.

$$U_1(x, \omega_1) = \int_{-\infty}^{\infty} u_1(x, t_1) e^{-i\omega_1 t_1} dt_1 \quad (1.13)$$

(3) Take $\omega_1(\omega)$ to be a bijective function over some range of $\omega$ that relates the approximate or true temporal derivative operator associated with $\omega_1$ used for solution $U_1(x,\omega_1)$ to the true $\omega$ used for the exact solution $U(x,\omega)$. This can be readily computed by taking a Fourier transform of the approximate operator and comparing that to the Fourier transform of an exact operator as discussed in a prior section. Likewise, take $\omega_2(\omega)$ to be a bijective function over some range of $\omega$ that relates the approximate or true temporal derivative operator $\omega_2$ used for solution $U_2(x,$ $\omega_2)$ to the true $\omega$ used for the exact solution $U(x,\omega)$. The invention converts an available solution $U_1(x,\omega_1)$ with the temporal numerical dispersion characteristics of temporal derivative operators associated with $\omega_1(\omega)$ to match a desired solution $U_2(x,\omega_2)$ with the temporal numerical dispersion characteristics of temporal derivative operators associated with $\omega_2(\omega)$ by finding the bijective relationship $\omega_2(\omega_1)$ and resampling $U_1(x,\omega_1)$ to get the desired values of $U_2(x,\omega_2)$ via equation (1.12). This is step 53.

(4) In step 54, perform an inverse temporal Fourier transform of $U_2(x,\omega_2)$ to get the temporal dispersion corrected or modified result $u_2(x,t_2)$ in the time domain (55).

$$u_2(x, t_2) = \frac{1}{2\pi} \int_{-\infty}^{\infty} U_2(x, \omega_2) e^{i\omega_2 t_2} d\omega_2 \quad (1.14)$$

Next, some aspects of the invention are described in more detail. The embodiment of the present invention implementing temporal numerical dispersion corrections, via resampling in the temporal Fourier domain, to simulated seismic data can be applied as a post-processing single-seismic-trace-at-a-time process applied either within the seismic simulator or as a separate seismic processing application. A flow chart showing basic steps in this embodiment of the present inventive method is given in FIG. 5. The associated computation time is negligible compared to the computation time needed for the simulator. The simulation time step and the source excitation time are required parameters and therefore incorporating this correction within the simulator application can be very convenient. If the application is done by a separate application, the simulation time step must be known in the separate application.

Figure 6:
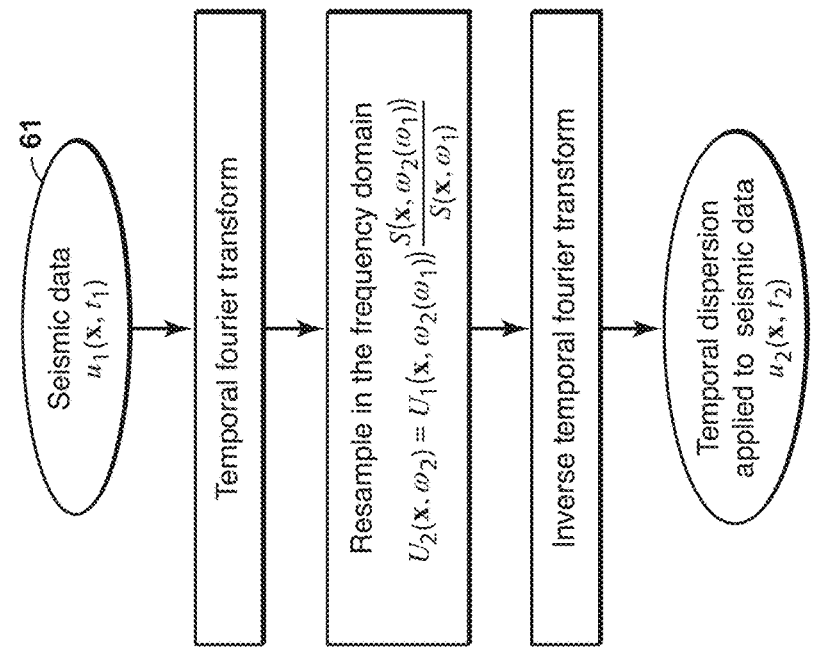
FIG. 6 is a flow chart giving basic steps in an embodiment of the present invention that applies temporal numerical dispersion to field seismic data, by resampling and scaling the transform of the seismic data in the frequency domain, so that the field data match the simulator data used in RTM or FWI gradient computations.
Figure 7:
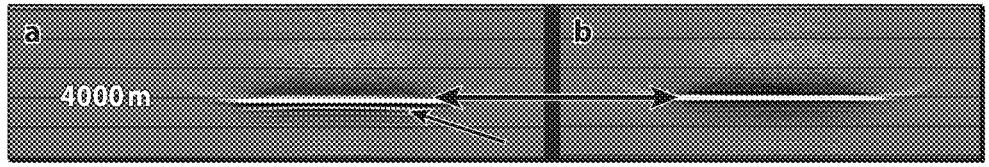
FIG. 7 shows an example, taken from Stork (2013), of how applying numerical temporal dispersion to the recorded seismic data improves the RTM image when the RTM image is computed using very long spatial derivative operators with an order of accuracy in the range from 24 to 30.

For a second embodiment of the present invention that applies temporal numerical dispersion via resampling in the temporal Fourier domain to field data to be input to RTM or FWI gradient or Hessian computation, this may be done as a preprocessing step. Basic steps in this embodiment are shown in FIG. 6, and it can be seen that the steps are the same as in FIG. 5, except that they are applied to the measured data 61 instead of the simulated data. However a different mapping relationship (not shown in the flow charts) will be used in the resampling step in the embodiment of FIG. 6, mapping frequency to a different $\omega_2$ than would typically be used in the embodiment of FIG. 5. Because the time step of the simulator used internally in the RTM or FWI application is required to be known, this step is most conveniently done as part of the RTM or FWI application, but can be done as separate pre-processing single-seismic-trace-at-a-time filter application. FIG. 7 taken from Stork (2013) shows the impact on an RTM image of applying temporal numerical dispersion to the input field data. It should be noted that Stork does this by method that is different from the present invention.

It may be noted that full waveform inversion can be corrected for temporal dispersion using either embodiment of the present inventive method, i.e. that of FIG. 5 or FIG. 6. In other words, the simulated data can be corrected to remove dispersion, or dispersion can be applied to the measured data to match the degree of dispersion introduced by whatever order of approximation the simulation time-stepping algorithm used to compute the time derivatives. As long as the simulated data and measured data have the same order of dispersion, the dispersion will cancel out when the objective function is computed to use for the model update.

Figure 8:
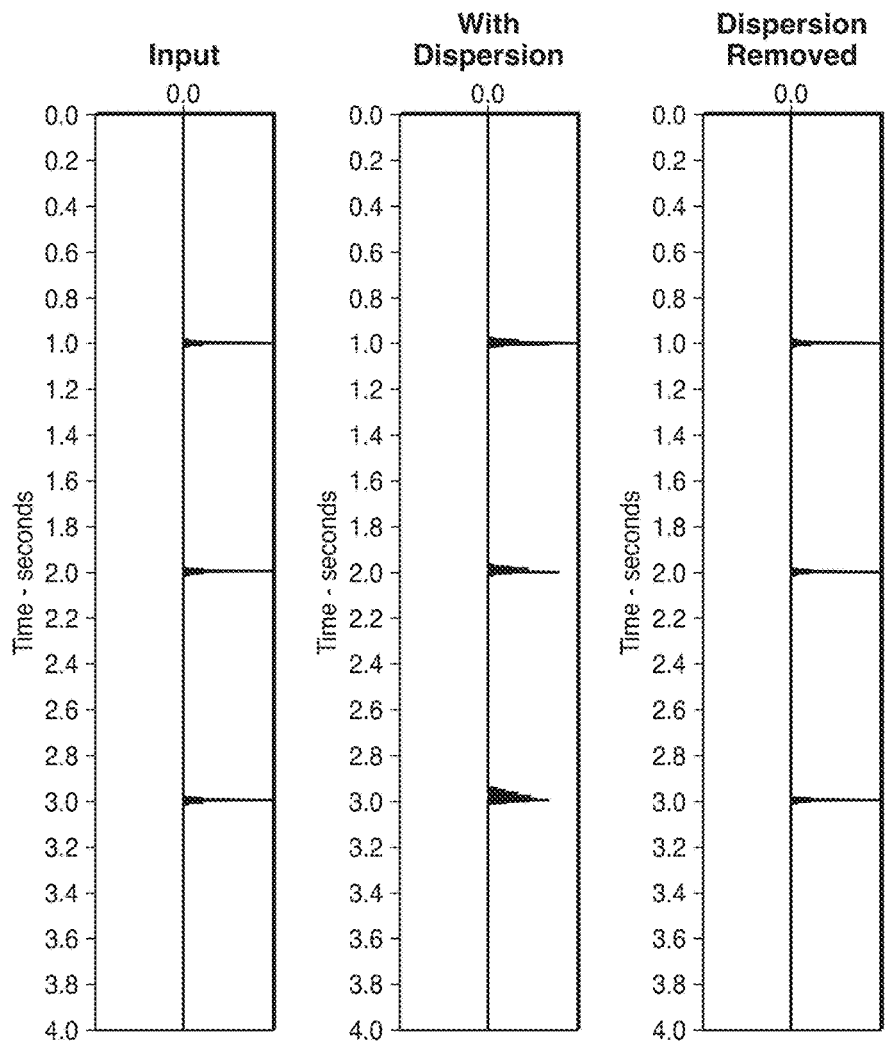
FIG. 8 shows the effects of temporal numerical dispersion on a broadband wavelet after wave propagation, causing the high-frequencies to propagate faster with a larger amount of dispersion visible at later times, which temporal dispersion can be removed by a correction operator.

The present invention can be used to either apply or remove all temporal numerical dispersion as shown in FIG. 8. The input has a broadband wavelet. After wave propagation, temporal numerical dispersion causes the high-frequencies to propagate faster with a larger amount of dispersion visible at later times. The temporal dispersion can be removed by a correction operator.

The present invention can be applied to change the temporal numerical dispersion characteristics of field or synthetic seismic data from any operator order to any other operator order. Equation 1.3 gives the relationship between true frequency and approximate frequency for explicit centered temporal finite difference operators on a regular grid. This relationship is objective over the specific range of frequency and time increment parameters of interest. Therefore the inverse relationship can be found. Therefore one can map any operator to the true operator and then back to another approximate operator. A general expression for the inverse may be difficult to write for some operator choices, but a computer can easily tabulate these and then look up values in the table to solve the inverse relationship.

Figure 9:
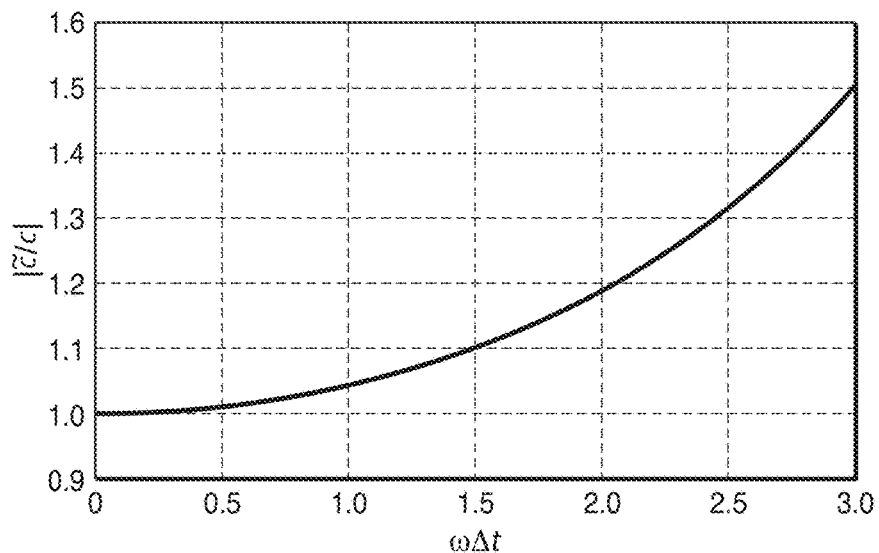
FIG. 9 is a plot of relative phase speed versus normalized frequency for time differencing for the second order approximation for the temporal second derivative (Tong Fei, 1994)
Figure 10:
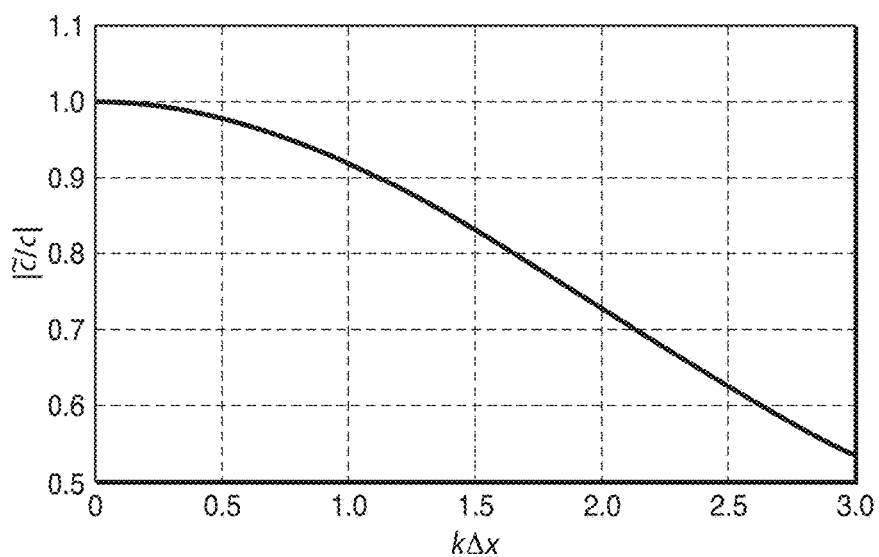
FIG. 10 is a plot of relative phase speed versus normalized wavenumber for spatial differencing for the second order approximation for the spatial second derivative, showing that the dispersion due to the spatial operator approximately cancels the dispersion due to the temporal operator when the operators are of the same order of accuracy (Tong Fei, 1994)

The effect of a second order temporal finite difference operator on phase velocity has been described by Fei (1994) and is shown in FIG. 9. The compensating errors for the same order of spatial operator are shown by Fei (1994) in FIG. 10. The error compensation is exact in one dimensional wave propagation but only approximate for two-dimensional and three-dimensional wave propagation. Accuracy is often improved by matching time derivative operators to the same order of accuracy as chosen for the spatial derivative operators. The logic behind making this choice is discussed by Aldridge and Haney (2008) where they recommend always matching the order of approximation for time derivatives and spatial derivatives. This choice can be made for either forward simulation or for RTM and FWI gradient and Hessian applications.

A key aspect of the methods disclosed herein, as indicated by equation (1.12), is that the seismic data can be advantageously modified from one form of $\omega$ operator to another form by resampling in the frequency domain. The input and output $\omega$ operators can be exact or approximate, and if approximate, they can be explicit or implicit.

A test of the present invention is shown in FIGS. 11A-11E, mapping temporal numerical dispersion from one order of accuracy to another. FIG. 11A shows three input spikes at periodic intervals for a finite difference computer simulation. FIG. 11B shows what they look like due to temporal numerical dispersion after time steps with the time derivative approximated at order 2. The dispersion was added using the FIG. 6 embodiment of the present invention. FIG. 11C shows how the result of FIG. 11B is corrected to change the temporal numerical dispersion from order 2 to order 8 using the present inventive method. This might be done to match eighth-order spatial operators for a code that had spatial numerical dispersion. FIG. 11D shows the result after mapping of 11C back to $2^{nd}$ order. The almost exact duplication of FIG. 11B shows how invertible the present inventive method is. To generate FIG. 11E, the present invention is applied to correct dispersion from order 2 to exact, i.e. the result in 11B (or 11D) is mapped to exact—all temporal numerical dispersion is removed.

An ideal simulation result with no temporal dispersion would be three spikes, i.e. this would be the ideal result for FIG. 11B. However, a simulator with time derivative operators that are second order accurate is used and creates data with temporal dispersion high frequency components that arrive early and the waveform shape varies with time. The dispersive simulated data with second order accuracy in time are converted into data with eighth order accuracy in time. These data can be mapped back to second order accuracy in time or back to data with no temporal numerical dispersion.

Low-frequency FWI is less affected by temporal numerical dispersion than broad-band FWI because temporal numerical dispersion is less important at low frequencies. High resolution images of the subsurface require broad band FWI, and temporal numerical dispersion corrections become more important. Temporal numerical dispersion corrections become very important when making accurate ties between inverted FWI earth model parameters and well logs.

Figure 12A:
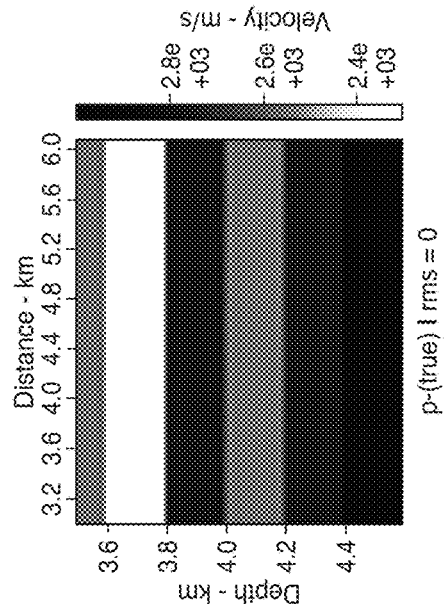
FIGS. 12A-12D show an example of how temporal dispersion corrections made with the present inventive method improve the broadband FWI results.
Figure 12B:
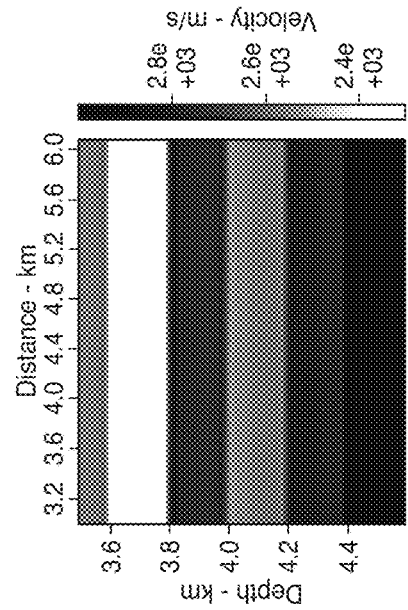
Figure 12C:
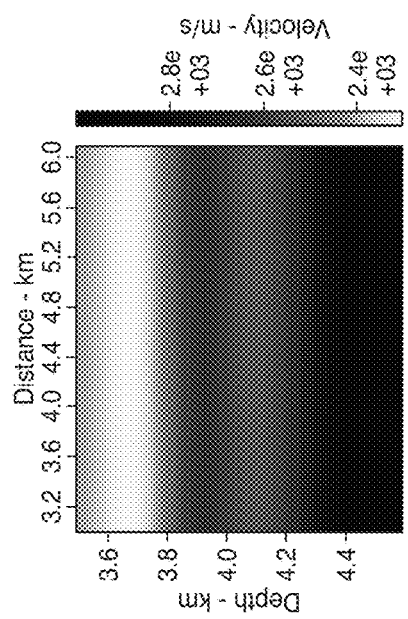
Figure 12D:
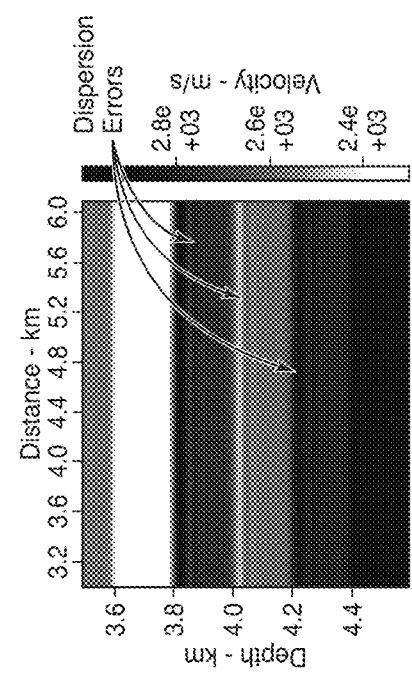

FIGS. 12A-12D provide an example of how temporal dispersion corrections improve broadband FWI results. The initial model input to a first iteration of FWI, shown in FIG. 12A, is a very smooth representation of the subsurface and lacks detail. The true layered model for this simulation and inversion is given in FIG. 12B. The estimated FWI model doing FWI without including temporal numerical dispersion corrections is given in FIG. 12C. It may be noted how the layer boundaries are fuzzy and that some high-wavenumber events appear within the blocky layers. When temporal numerical dispersion corrections (made by the present inventive method) are included in the FWI earth model estimation process, the result, shown in FIG. 12D, is much closer to the true model.

Figure 13C:
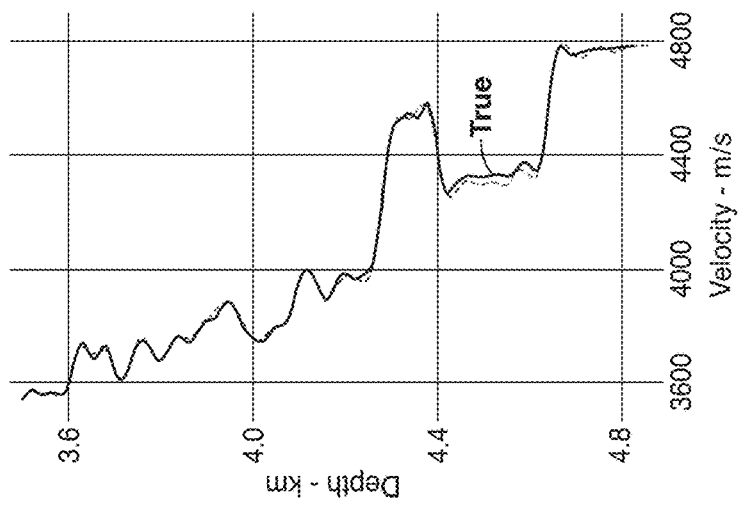
FIGS. 13A-13C show another example of how temporal dispersion corrections made with the present inventive method improve the broadband FWI results.
Figure 13B:
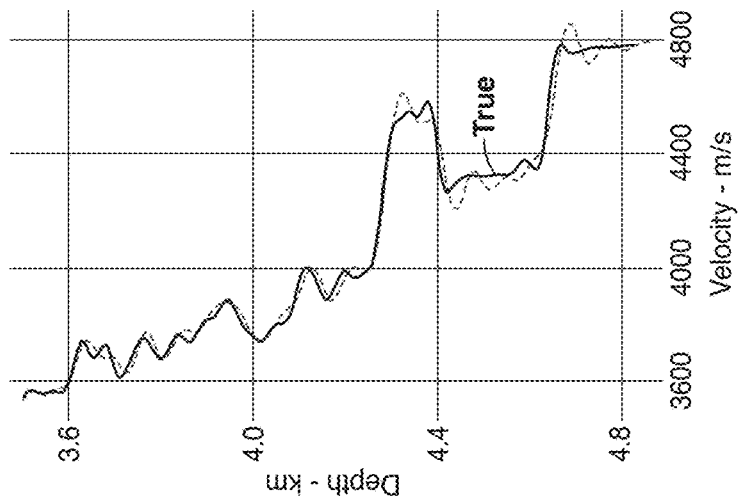
Figure 13A:
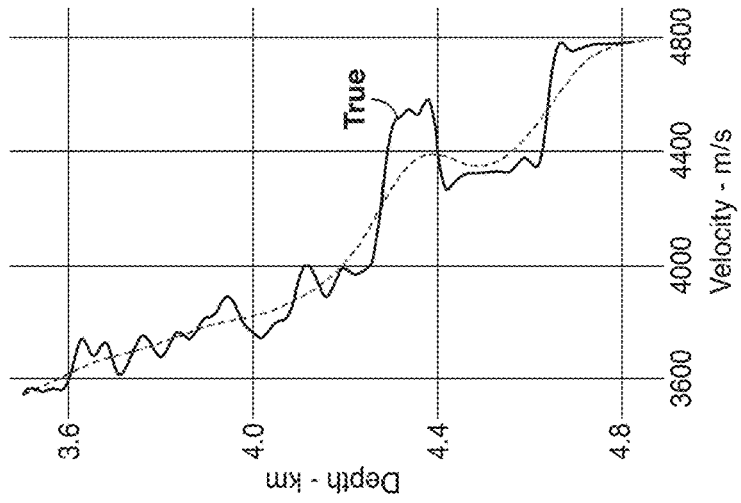

FIGS. 13A-13C provide an example of how temporal dispersion corrections improve the broadband FWI results for another earth model, one with a more realistic "true" velocity model. Comparisons are made between synthetic well data (gray) versus the earth model. In FIG. 13A, the smooth initial earth model is compared to the true earth model. In FIG. 13B, the inverted FWI model without dispersion corrections is compared to the true earth model. In FIG. 13C, the FWI model with temporal numerical dispersion corrections are compared with the true earth model. Note that the improved result in 13C was generated by first applying temporal numerical dispersion to the true data, using the embodiment of the invention illustrated in FIG. 6, prior to running FWI with pre-defined simulation time-step of 0.001 sec and spatial finite difference order fourteen. Inaccuracies in the phase of the inverted model shown in FIG. 13B relative to the true model have been corrected using the invention. Computational costs for both 13B and 13C are similar. A geologist with expertise in well-log interpretation would note that the inverted FWI result with temporal numerical dispersion correction included would provide a significantly different interpretation of potential reservoir properties than the FWI result without the correction.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

REFERENCES

Aldridge, David F., and Matthew M. Haney, "Numerical dispersion for the conventional-staggered-grid finite-difference elastic wave propagation algorithm," Sandia National Laboratories, SAND2008-4991 (2008).

Claerbout, J., *Imaging the Earth's Interior*, Blackwell Scientific Publications, 96-99, 104, 116, 126, 141, 256-257, 265, 284, 305-307 (1985); this book may be viewed online at Stanford.edu/data/media/public/sep//prof/index.

Crank, J., and P. Nicolson, "A practical method for numerical evaluation of solutions of partial differential equations of the heat conduction type". *Proc. Camb. Phil. Soc.* 43 (1), 50-67(1947).

Fei, Tong, "Elimination of numerical dispersion in finite difference modeling and migration by flux-corrected transport," Ph.D. thesis, Colorado School of Mines (1994), particularly FIGS. 3.1 and 3.2; cwp.mines/edu/researchpublications/CWPresearchreports.

Morse, P. M. and Feshbach, H., *Methods of Theoretical Physics, Part I.*, New York, McGraw-Hill, pp. 125-126, 271, and 509-510 (1953).

Stork, Christof, "Eliminating nearly all dispersion error from FD modeling and RTM with minimal cost increase," EAGE expanded abstracts (2013).

Zhang, Linbin, Guojian Shan, Yue Wang, United States Patent Application Publication US 2012/0243371 A1(Sep. 27, 2012).

The invention claimed is:

1. A method for prospecting for hydrocarbons, comprising:
    obtaining measured seismic data;
    generating, with a computer, simulated seismic data using a finite-difference, time-stepping algorithm that approximates a time derivative operator to a selected order of approximation;
    performing, with the computer, full waveform inversion or reverse time migration of the measured seismic data with the simulated seismic data, wherein temporal numerical dispersion corresponding to the selected order of approximation is (i) removed from the simulated seismic data or (ii) introduced into the measured seismic data by steps including,
        performing, with the computer, a Fourier transform in time on (i) the simulated or (ii) the measured seismic data,
        then resampling the transformed seismic data in frequency domain, and then performing an inverse Fourier transform from frequency domain back to time domain,
        wherein said resampling utilizes a property of a class of stationary finite-difference operators,
        wherein in frequency domain, an aspect of the temporal numerical dispersion is that a desired numerical solution for a given frequency is computed at an incorrect frequency, and said resampling uses a mapping relationship that maps the incorrect frequency to the given frequency; and
    prospecting for hydrocarbons with the full-waveform-inverted seismic data or the reverse-time-migrated seismic data.

2. The method of claim 1, further comprising scaling the resampled frequency-domain seismic data with a frequency-dependent scaling factor before performing the inverse Fourier transform back to time domain.

3. The method of claim 2, wherein simulation of the seismic data comprises a wave propagation equation with a stationary, finite-difference differential operator and a source term S in frequency domain, and wherein the scaling factor can be expressed as $$\frac{S(x, \omega_2(\omega_1))}{S(x, \omega_1)}$$

where $\omega_1$ is the incorrect frequency, $\omega_2$ is the given frequency, and x is spatial location of the source.

4. The method of claim 1, wherein the time derivative being approximated by the finite-difference algorithm is a centered second derivative, the given frequency is true frequency, and the mapping relationship can be expressed as $$\omega_{approx}(n_{order}, \omega, \Delta t) = \frac{\sqrt{-a_0 - 2\sum_{j=1}^{n_{order}/2} a_j \cos(j\omega\Delta t)}}{\Delta t}$$

where $\omega_{approx}$ is the incorrect frequency, $\omega$ is the true frequency, $n_{order}$ is the selected order of approximation, $\Delta t$ is duration of a time step in the algorithm, $a_j$ are coefficients of a symmetric filter used to approximate the second derivative operator, and j is an integer index ranging from 1 to $n_{order}/2$.

5. The method of claim 1, wherein said class of stationary finite-difference operators includes any differential operator that operates on a function of spatial position and time to equate to a source term, where the differential operator includes at least one spatial derivative of any order, at least one time derivative of any order, and may vary with position but is constant with time.

6. The method of claim 1, wherein temporal numerical dispersion is removed from simulated seismic data by using a mapping relationship that maps the incorrect frequency to a true frequency, being a frequency at which the simulation generates a solution for the incorrect frequency with no temporal numerical dispersion.

7. The method of claim 6, wherein spatial derivatives in the finite difference time stepping algorithm are approximated to order at least 20.

8. The method of claim 1, wherein temporal numerical dispersion is removed from simulated seismic data by using a mapping relationship that maps the incorrect frequency to a frequency at which the simulation generates a solution having temporal numerical dispersion of a same order of approximation as a spatial derivative approximation in the finite-difference algorithm.

9. The method of claim 1, wherein temporal numerical dispersion corresponding to the selected order of approximation in the algorithm is introduced into the measured seismic data to match the temporal numerical dispersion present in the simulated seismic data, said introduction of temporal numerical dispersion into the measured seismic data using a mapping relationship that is an inverse of a frequency mapping relationship that would remove all temporal numerical dispersion from the simulated seismic data.

10. The method of claim 1, wherein prospecting for hydrocarbons comprises causing a well to be drilled at a location identified using the full-waveform-inverted seismic data or the reverse-time-migrated seismic data.

11. A method for prospecting for hydrocarbons, comprising:
    obtaining measured seismic data;
    simulating, with a computer, seismic data to correspond to the measured seismic data using a finite-difference, time-stepping algorithm programmed on a computer, which algorithm approximates a time derivative operator to a selected order of approximation;
    removing, with the computer, temporal numerical dispersion caused by the approximation from the simulated seismic data using steps including, Fourier transforming, with the computer, the simulated seismic data to frequency domain, wherein a time variable is transformed to a frequency variable, resampling, with the computer, the simulated seismic data in the frequency domain, and inverse-transforming, with the computer, the resampled simulated seismic data back to time domain;

reverse-time migrating, with the computer, the measured seismic data with the resampled data in time domain, or inverting, with the computer, full-wavefield inversion the measured seismic data with the resampled data in time domain;

generating a subsurface image from the reverse-time migration or a subsurface model from the full-wavefield inversion; and prospecting for hydrocarbons with the subsurface image or the subsurface model.

12. The method of claim 11, wherein the resampling maps the simulated seismic data for a given frequency to a different frequency at which the temporal numerical dispersion is removed.

13. The method of claim 11, wherein prospecting for hydrocarbons comprises causing a well to be drilled at a location identified using the subsurface image or the subsurface model.

14. A method for prospecting for hydrocarbons, comprising:

obtaining measured seismic data;

simulating, with a computer, seismic data to correspond to the measured seismic data using a finite-difference, time-stepping algorithm programmed on a computer, which algorithm approximates a time derivative operator to a selected order of approximation;

introducing, with the computer, temporal numerical dispersion into the measured seismic data to match temporal numerical dispersion caused in the simulated seismic data by the selected order of approximation, using steps comprising:

Fourier transforming, with the computer, the measured seismic data to frequency domain, wherein a time variable is transformed to a frequency variable;

resampling, with the computer, the measured seismic data in the frequency domain;

inverse-transforming, with the computer, the resampled measured seismic data back to time domain;

reverse-time migrating or full-wavefield inverting the time domain resampled measured seismic data with the simulated seismic data;

generating a subsurface image from the reverse-time migration or a subsurface model from the full-wavefield inversion; and prospecting for hydrocarbons with the subsurface image or the subsurface model.

15. The method of claim 14, wherein the resampling maps the measured seismic data for a given frequency to a different frequency at which temporal numerical dispersion corresponding to the order of approximation in the algorithm is introduced into the measured seismic data.

16. The method of claim 14, wherein prospecting for hydrocarbons comprises causing a well to be drilled at a location identified using the subsurface image or the subsurface model.

* * * * *